Sept. 11, 1956  J. FRASER  2,762,389
VALVES FOR CONTROLLING THE FLOW OF LIQUIDS
Filed Aug. 7, 1953  5 Sheets-Sheet 1

INVENTOR
John Fraser,
BY

Sept. 11, 1956　　　　　J. FRASER　　　　　2,762,389
VALVES FOR CONTROLLING THE FLOW OF LIQUIDS
Filed Aug. 7, 1953　　　　　　　　　　　　　　5 Sheets-Sheet 2

INVENTOR
John Fraser,
BY

Sept. 11, 1956    J. FRASER    2,762,389
VALVES FOR CONTROLLING THE FLOW OF LIQUIDS
Filed Aug. 7, 1953    5 Sheets-Sheet 3

INVENTOR
John Fraser,
BY

Sept. 11, 1956 J. FRASER 2,762,389
VALVES FOR CONTROLLING THE FLOW OF LIQUIDS
Filed Aug. 7, 1953 5 Sheets-Sheet 5

INVENTOR
John Fraser,
BY

United States Patent Office 2,762,389
Patented Sept. 11, 1956

2,762,389
VALVES FOR CONTROLLING THE FLOW OF LIQUIDS

John Fraser, Tolworth, Surbiton, England, assignor to Avery-Hardoll Limited, Tolworth, Surbiton, Surrey, England Application August 7, 1953, Serial No. 372,945

Claims priority, application Great Britain August 7, 1952

5 Claims. (Cl. 137—390)

This invention relates to valve devices for controlling the flow of liquids, and, more particularly, to valve devices for controlling the filling of tanks and like receptacles so that the supply is cut off when the liquid in the receptacle reaches a predetermined level.

The main object of the invention is to provide an improved and simplified valve for the above purpose, and a further object is to provide a valve suitable for mounting at the bottom of the receptacle, so that it can also be used for emptying the receptacle.

According to the invention, a valve device for controlling the filling of receptacles with liquid comprises a main valve closure member urged towards an open position by liquid flowing into the receptacle to which the valve is fitted, resilient means urging the said valve closure member towards a seat, a control chamber bounded in part by said valve closure member and in which liquid pressure acts to urge said valve closure member towards the seat, means to supply liquid at a controlled rate from the upstream side of the valve device to said control chamber, and auxiliary valve means which, when open, allow the escape of liquid from the control chamber, the auxiliary valve means being operated automatically, when the liquid in the receptacle reaches a predetermined level, to restrict the escape of liquid from the control chamber and thereby to cause the building up of pressure in the control chamber, which pressure, together with the resilient means, provides a closing thrust on the main valve closure member sufficient to overcome the liquid pressure acting on its upstream side.

Further, according to the invention, a valve device for controlling the filling of receptacles with liquid comprises a differential area valve closure member having its smaller area subject to the pressure of incoming liquid and its larger area subject to liquid pressure in a control chamber fed by the said incoming liquid, auxiliary valve means controlling the escape of liquid from said control chamber, suction operated motor means controlling said auxiliary valve means, and means responsive to the liquid level in the receptacle for effecting operation of said motor means.

According to another aspect of the invention, a valve device for mounting at the bottom of a receptacle to control the flow of liquid into and out of the receptacle comprises an inflow and outflow orifice, a main valve closure member to control said orifice and opening in an inward direction, a valve housing in said receptacle defining a control chamber into which the main valve closure member moves as the valve device opens, a passage connecting the control chamber to the upstream side of the valve device when the valve device is open, auxiliary valve means controlling escape of liquid from the control chamber to the receptacle, means responsive to the level of liquid in the receptacle to close said auxiliary valve means and thereby cause building up of pressure in said control chamber to urge said main valve closure member towards the closed position, and means for manually lifting said valve closure member to allow the escape of liquid from the receptacle.

The invention is hereinafter described with reference to the accompanying drawings, in which.

Figure 1:
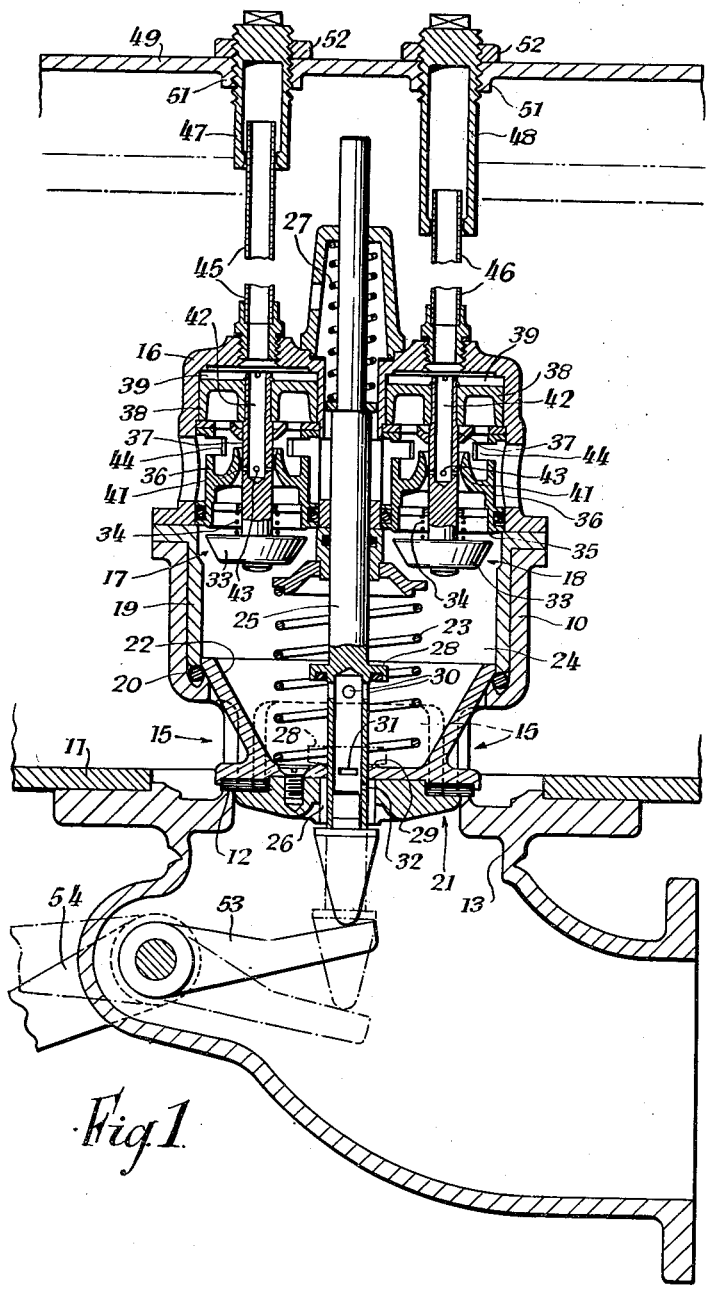
Figure 1 is a sectional elevation of one form of valve device according to the invention, the parts being in the positions which they occupy when the device has been set to allow the admission of liquid to the receptacle but the supply has not yet commenced.
Figure 2:
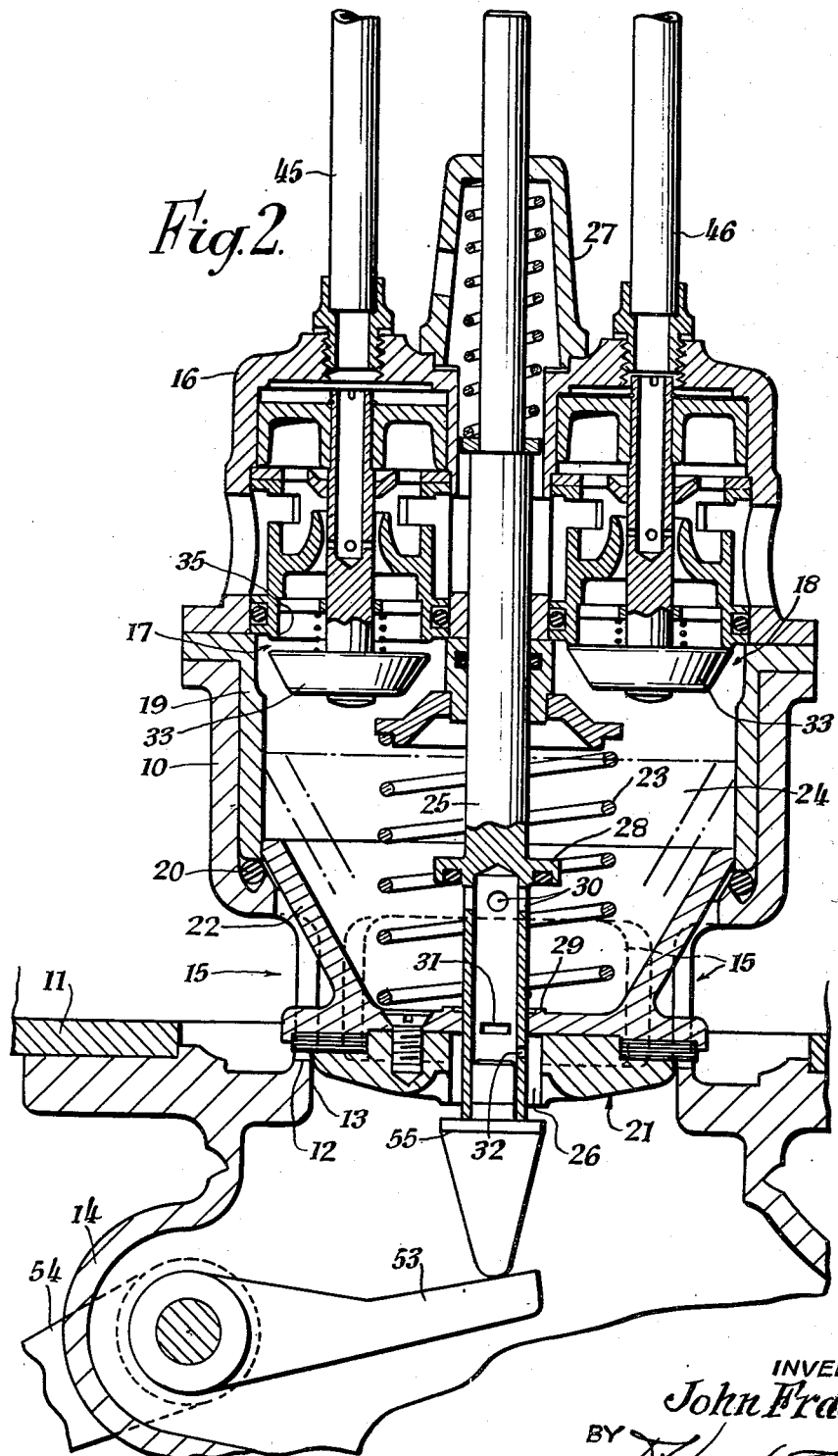
Figure 2 is a sectional elevation similar to Figure 1, showing the position of the parts at the completion of the first stage of closure of the valve device.

Referring to Figures 1 and 2 of the drawings, a valve body 10 is mounted in the bottom of a tank, the bottom wall of which is indicated at 11. The valve body 10 is cylindrical, its lower end being formed with an internal flange the edge of which is formed to provide an upwardly facing valve seat 12, of smaller diameter than the interior of the valve body, surrounding an orifice 13. An elbow 14 integral with the valve body and projecting externally of the tank provides a connection for the attachment of a hose thereto. A series of radial ports 15 in the valve body immediately above the valve seat 12 provide communication between the lower end of the valve body and the tank. The upper end of the valve body is closed by a cover 16 in which are mounted two auxiliary valves 17 and 18, described in detail below. A flanged sleeve 19, clamped between the body 10 and the cover 16 locates in the valve body a packing ring 20.

A main valve closure member 21 has a frusto-conical skirt 22 the edge of which fits closely in the cylindrical portion of the body 10 and engages, when the valve is closed, with the packing ring 20. The valve closure member 21 is urged downwardly on to the valve seat 12 by a spring 23, the edge of the skirt 22 being at all times above the upper edges of the ports 15, and the member 21 defines, with the valve body, a closed chamber 24 hereinafter referred to as the control chamber. A stem 25, mounted co-axially with the valve closure member 21, passes through an orifice 26 in the centre of the said member, the stem being a close sliding fit in the upper part of the hole. The stem 25 is urged downwardly by a spring 27 to engage a packing mounted in a shoulder 28 thereon with a seat 29 on the valve closure member 21 as shown in chain-dotted lines in Figure 1, the seat 29 surrounding the orifice 26. A part of the stem 25 below the shoulder 28 is hollow, a ring of radial ports 30 being provided just below the shoulder 28 to connect the upper end of the hollow portion to the exterior of the stem, and two axially spaced ports 31 and 32 being formed adjacent the lower end of the hollow portion.

Each of the two auxiliary valves 17 and 18 comprises a movable head 33 urged downwardly by a light spring 34 away from a seat 35 on the periphery of a sleeve 36, the valve head 33 being carried by a stem 37 to which is secured a piston 38 working in a cylinder 39 above the sleeve 36, each piston 38 and cylinder 39 together forming a suction-operated motor device to close the valve 17 or 18. The sleeve 36 of each valve is formed at 41 to the shape of a venturi through which the valve stem 37 passes, each valve stem 37 being drilled axially from its upper end and the drilling 42 being intersected by radial ports 43 which open into the throat of the venturi 41. Above the venturi 41, each sleeve is formed with ports 44 opening into the tank. The axial drillings 42 open into the upper ends of the cylinders 39, and from each such cylinder a pipe extends upwardly into the tank, the pipes associated with the auxiliary valves 17 and 18 being shown at 45 and 46 respectively. The upper ends of the pipes 45 and 46 extend respectively into the lower ends of larger pipes 47 and 48 (Figure 1) depending from the top 49 of the tank, the pipes 47 and 48 fitting with a small clearance around the pipes 45 and 46. Both of the larger pipes 47 and 48 are closed at their upper ends, and are vertically adjustable in the tank, their upper ends being screw-threaded to engage with screw-threaded bosses 51 in the tank wall, and with lock-nuts 52. The pipe 47 is so adjusted that its lower end is at the level to which the tank is to be filled, the pipe 48 extending to a somewhat lower level, for example one inch lower.

An arm 53, pivotally mounted in the elbow 14, and operable manually by an external handle 54, provides a means for lifting the stem 25 to disengage the shoulder 28 from the seat 29. The stem 25 may be lifted to a position in which an enlargement 55 thereon below the port 32 is spaced by a small distance from the underside of the valve closure member 21, in which position it is shown in full lines in Figure 1, or may be lifted further so that the enlargement 55 engages and lifts the valve closure member.

The operation of the valve device to control the supply of liquid to the tank is as follows.

A supply hose is connected to the elbow 14, and the stem 25 is raised by operation of the handle 54 until the enlargement 55 is just below the underside of the valve closure member 21, the parts then being in the position shown in Figure 1. Liquid is then supplied through the hose, the liquid lifting the valve closure member 21 off the seat 12, and flowing through the orifice 13 and ports 15 into the tank. The valve closure member 21 rises to the position in which its upper part is marked in chain-dotted lines in Figure 2, the base thereof then being between the ports 30 in the stem and the port 31 therein. Liquid therefore also flows through the ports 31 and 32 into the hollow part of the stem 25, and out through the ports 30 into the control chamber 24. This liquid escapes from the control chamber through the auxiliary valves 17 and 18, and no substantial pressure is therefore built up in the control chamber. The ports 31 and 32 introduce a restriction of flow of liquid into the control chamber 24 such that the pressure drop across the valve closure member is greater than the closing pressure provided by the valve spring 23, and the resultant force on the valve closure member is thus in the opening direction. The liquid escaping from the control chamber 24 through the open auxiliary valves 17 and 18 passes through the venturi 41, and thus induces flow of air from the tank through the pipes 45 and 46 and the cylinders 39 of the two suction motors.

These conditions are maintained until the liquid in the tank rises sufficiently to cover the lower end of the pipe 48, and thus prevents air from being drawn through the pipe 46. A depression is thus produced in the cylinder 39 of the suction-operated motor associated with the auxiliary valve 18, raising the piston 38 of that motor, and with it the valve head 33, to close that auxiliary valve. When the auxiliary valve 18 has closed liquid can escape from the control chamber 24 only through the auxiliary valve 17, with the result that pressure builds up in the control chamber, and moves the main valve closure member 21 towards its seat. The movement of the valve closure member 21 continues until the port 31 enters the upper part of the orifice 26, thus reducing the rate at which liquid enters the control chamber 24 to an extent such that a state of equilibrium is restored and the main valve closure member 21 remains in a nearly closed position. The parts are shown in this position in Figure 2.

Liquid continues to flow into the tank at a reduced rate until the level rises far enough to submerge the lower end of the pipe 47, when the auxiliary valve 17 is closed in the same manner as was the auxiliary valve 18, and escape of liquid from the control chamber 24 is completely prevented. Pressure therefore again builds up in the control chamber 24 to complete the closing of the main valve. The stem 25 is then allowed to return to its lower position, in which the packing on the shoulder 28 engages the seat 29, thus providing a completely liquid-tight closure of the tank. The hose can then be detached from the elbow. The auxiliary valves 17 and 18 re-open when the supply pressure is removed from the chamber 24, since very slight leakage can take place through them to destroy the pressure difference across them.

The provision for the closing of the valve in two stages enables liquid to be supplied to the tank at a considerable speed during the greater part of the filling operation, since it permits the main valve to move slowly from the fully open position to the partially open position during the first stage of closure, thus avoiding water hammer during that stage, and provides a much reduced rate of flow before the final cut-off. A quick final cut-off can therefore be effected without introducing water hammer at the second stage of closure, and the reduced rate of flow before the final cut-off allows the surface of the liquid in the tank to become calm before the cut-off takes place. The quick final cut-off and the previous calming of the surface of the liquid both contribute to the accuracy of the cutoff.

For emptying the tank, the main valve closure member 21 is lifted from its seat by the valve stem 25.

In the form of valve device according to the invention shown in Figures 3 to 6 only a single auxiliary valve is employed, and this auxiliary valve is closed in two stages by a single suction-operated motor.

As in the previous example, a valve body 61, of generally cylindrical shape, is mounted in the bottom of the tank, the valve body 61 having an open lower end which communicates, through an orifice 62 bounded by a seat ring 63, with an elbow 64 adapted for connection to a liquid supply conduit. Radial ports 65 open from the lower end of the body 61 into the tank, the bottom wall of the tank being indicated at 66. The seat ring 63 supports an annular ring 67 of rubber or like material forming a seat for a cup-shaped main valve closure member 68 slidably mounted in the body 61, the valve closure member 68, at its upper end, being a sliding fit in the body 61 above the radial ports 65, and being reduced in diameter at its lower end so that the area of the said valve closure member exposed to pressure in the elbow 64 when the valve is closed is less than the area of the upper end of the said member. A packing ring 69 mounted in a groove in the member 68 provides a fluid-tight sliding joint with the wall of the body 61.

A spider 70 integral with the seat ring 63 supports a guide 71 for a vertically slidable pin or stem 72 passing through a circular orifice 73 in the base of the valve closure member, the pin 72 being formed with a flange 74 which normally rests on the guide 71 and carries a flexible seat ring 75 which, when the valve closure member 68 is seated, engages the latter around the orifice 73. Above the flange 74, the pin 72 has a short cylindrical portion 76 of slightly smaller diameter than the orifice 73, the part 77 of the pin above the cylindrical portion 76 being reduced in cross sectional area, conveniently by cutting flats thereon as shown.

The pin 72 is movable upwardly by means of a lever 78 pivotally mounted in the elbow, to lift the valve closure member 68 off its seat, but when the valve closure member is lifted by incoming liquid, the pin remains in its lowermost position, being held therein by a spring 79, and liquid can flow into the space in the body 61 immediately above the valve closure member 68, which space is hereinafter called the control chamber 81.

The valve closure member 68 is urged towards the seat ring 63 by a coiled compression spring 82 taking its abutment on a shoulder 83 formed on a cylinder 84 located co-axially in the body 61, the spring 82 serving to hold the cylinder 84 against a stop 85 at its upper end. The cylinder 84 is divided into upper and lower compartments 86 and 87 by a rigid partition 88 through which passes a tubular stem 89 carrying a piston 91 slidable in the upper compartment 86, and a disc 92 capable of engaging the edge 93 of the lower end of the cylinder to isolate the lower compartment 87 thereof from the control chamber 81. The disc 92 thus acts as an auxiliary valve to close a liquid escape path from the chamber 81. The disc 92 is urged downwardly away from the lower end of the cylinder 84 by a spring 94 located between it and the partition 88.

The lower end of the stem 89 is closed, except for a small port 95 (Figure 3) controlled by a heavily loaded, upwardly opening non-return valve 96, the stem 89 being open at its upper end, and having lateral ports 97 opening into the lower compartment 87 of the cylinder. The upper end of the stem 89 extends into a reduced bore 98 co-axial with the cylinder 84, the upper end of the bore being in permanent communication, through a venturi 99 disposed horizontally in the body, with the interior of the tank. A sleeve 101 fixed in position in the reduced bore 98 is formed with upper and lower internal circumferential grooves 102 and 103, the upper groove 102 being connected, through a relief valve 104 (Figure 6), with the interior of the tank. The lower groove 103 is connected, by passages 105, 106 (Figure 5) to one of two pipes 107 and 108 extending upwardly from the body into the tank, the second pipe 108 being connected by a passage 109 to the upper compartment 86 of the cylinder 84. Another passage 111 connects the compartment 86 to an annular chamber 112 around the throat of the venturi 99, the chamber 112 being connected to the said throat by small ports 113. A circumferential groove 114 in the outer surface of the tubular stem provides communication when the stem is lifted, between the compartment 86 and the lower groove 103.

Figure 3:
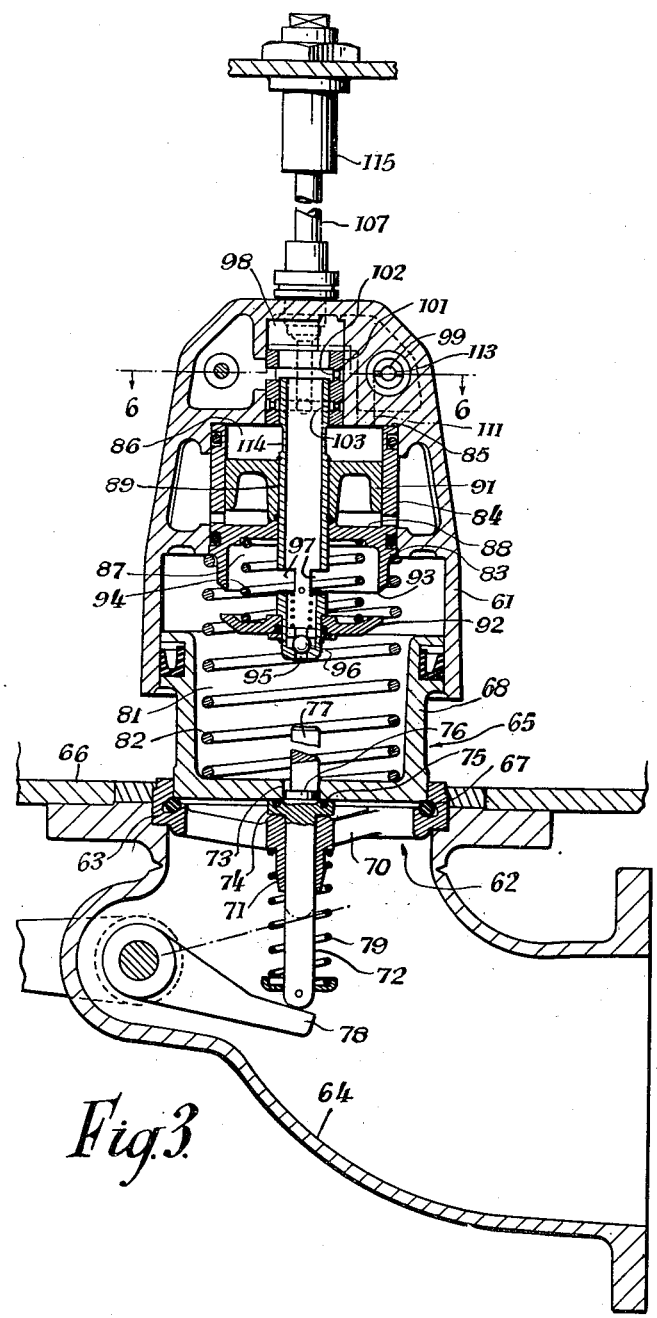
Figure 3 is a sectional elevation of another form of valve device, the valve being in its closed position.

As in the example previously described, the pipes 107 and 108 extend upwardly into larger dependent pipes, one of which is shown at 115 in Figure 3, the dependent pipes having their lower ends at different levels. The dependent pipe 115 extends to the level to which the tank is to be filled, and the other dependent pipe extends somewhat lower.

Figure 4:
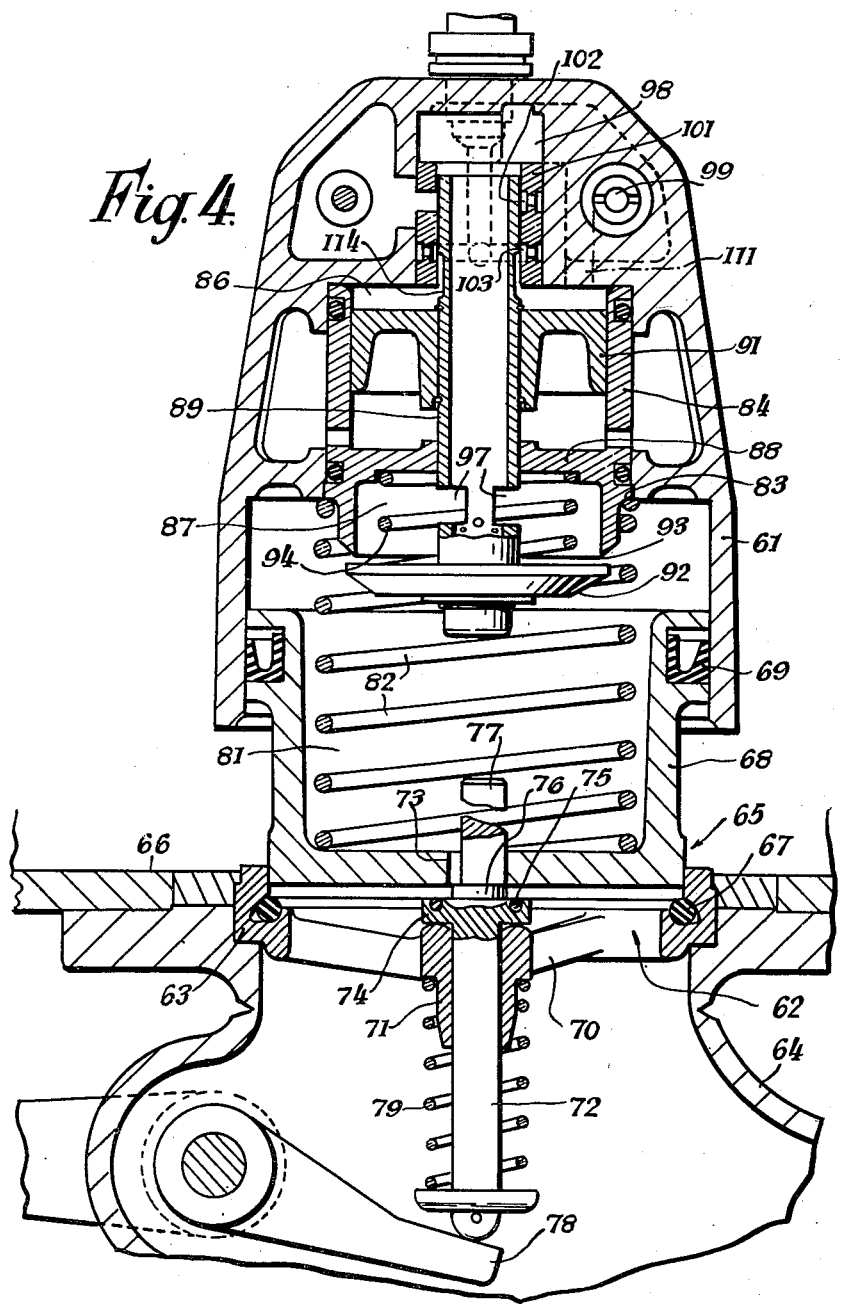
Figure 4 is a sectional elevation similar to Figure 3, showing the position of the parts at the completion of the first stage of closure of the valve device.
Figure 5:
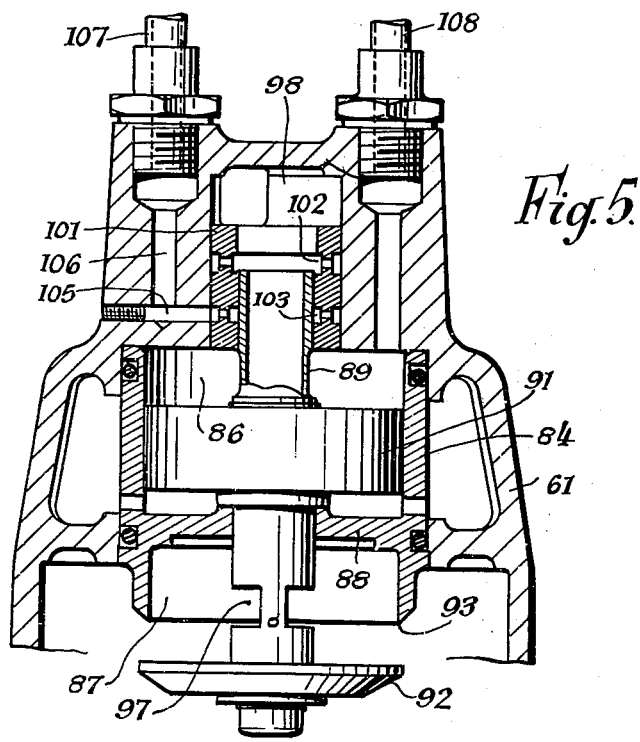
Figure 5 is a sectional elevation, in a plane at right angles to that of Figures 3 and 4, through the upper part of the valve device shown in those figures.
Figure 6:
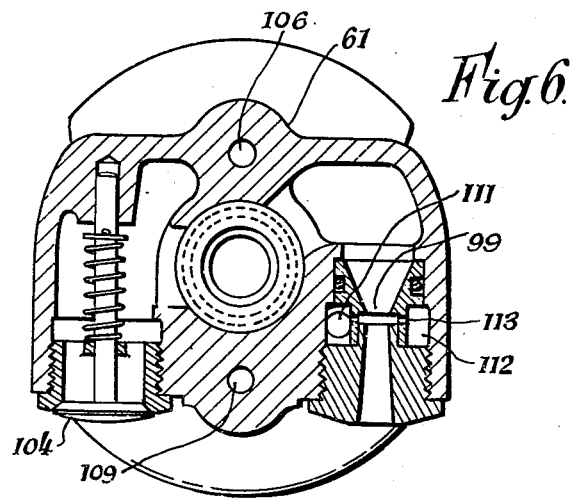
Figure 6 is a sectional plan on the line 6—6 of Figure 3.

The operation of the valve device described with reference to Figures 3 to 6 is as follows. Liquid supplied under pressure through a hose connected to the elbow 64 lifts the valve closure member 68 from its seat, and flows through the orifice 62 and ports 65 into the tank. The lifting of the valve closure member 68 brings the orifice 73 in its base into a position in which it surrounds the upper part 77 of the pin, and liquid flows through the hole 73 into the control chamber 81. The disc 92 is in its lowermost position, so the liquid entering the control chamber passes upwardly into the lower compartment 87 of the cylinder 84, and through the stem 89, some of it passing through the venturi 99 into the tank. The upper end of the tubular stem 89 is below the groove 102, so that liquid also flows through the relief valve 104, which, as it opens at a very low pressure, prevents a pressure from being built up in the control chamber 81, due to the restriction at the venturi, sufficient to move the valve closure member 68 towards its seat. Thus the setting of the relief valve determines the maximum flow through the venturi. The flow of liquid through the venturi 99 causes air to be sucked from the upper compartment 86 of the cylinder 84, but so long as air can enter that compartment through the pipe 108 no substantial pressure drop takes place in that compartment. When, however, the liquid rises to a level such that it closes the lower end of the dependent pipe associated with the pipe 108, the suction produces a substantial depression in the compartment 86, and the piston 91 is lifted until the groove 114, by connecting the compartment 86 to the pipe 107 as shown in Figure 4, admits air to the said compartment through that pipe. The upward movement of the piston lifts the disc 92 to the position shown in Figure 4 in which it is quite close to the lower edge of the cylinder 84, and simultaneously, by moving the stem 89 to a position in which it covers the groove 102, prevents the escape of liquid from the control chamber 81 through the relief valve 104, with the result that pressure builds up in that chamber and urges the main valve closure member 68 downwardly towards its seat until it reaches the position shown in Figure 4 where the cylindrical portion 76 of the pin 72 enters the orifice 73, and so reduces the rate of flow of liquid into the control chamber. The pressure in the control chamber 81 then falls until the forces acting on the main valve closure member are again balanced, and the said member remains in a nearly closed position. This position is maintained until the liquid in the tank closes the lower end of the pipe 115, when suction is again applied to the piston 91 to lift the disc 92. When the disc 92 reaches the lower end of the cylinder 84 the flow of liquid out of the control chamber 81 is stopped, causing the pressure in the said control chamber to build up, and thus urging the valve closure member 68 firmly on to its seat and holding the disc 92 against its seat 93. The disc 92 remains in contact with the lower end of the cylinder until the supply pressure is cut off, there being very slight leakage past it which allows the pressure in the control chamber 81 to dissipate.

During the first upward movement of the piston 91 due to closing of the pipe 116, the stem 89 covers the groove 102 and cuts off the relief valve 104 from the passage through the stem, so that the whole of the liquid passing through the stem must also pass through the venturi 99.

The non-return valve 96 acts as a pressure relief valve allowing the escape of liquid from the control chamber 81, thus allowing the main valve closure member 68 to lift slightly after closing to relieve pressure surges.

The valve closure member 68 may be lifted to allow escape of liquid from the tank by operating the lever 78 to move the pin 72 upwardly. Alternatively, if the packing 75 is omitted, so that slight leakage of liquid through the orifice 73 can take place when the valve is closed, the main valve closure member 68 can be unseated by applying suction to the elbow, thus creating a depression on the control chamber 81.

The elbow, in either of the arrangements above described, preferably carries one half of a self-sealing coupling device and is thus closed automatically when no supply hose is connected thereto.

I claim:

1. A valve device for controlling the filling of receptacles with liquid comprising a body defining a through passage for the liquid and a valve seat in said passage, a main valve closure member co-operating with said valve seat to close the passage and urged towards an open position by liquid flowing through said passage into the receptacle to which the valve device is fitted, resilient means urging said valve closure member towards the seat, a control chamber in said body in which liquid pressure acts to urge said valve closure member towards the seat, orifice means providing communication between the upstream side of the valve closure member and said control chamber, auxiliary valve means to control the escape of liquid from said control chamber and having predetermined open, partly open and closed positions, means responsive to the liquid level in the receptacle to operate the auxiliary valve means, said liquid level responsive means acting when the liquid reaches a lower predetermined level to move said auxiliary valve means from its open to its partially open position and when the liquid reaches a higher predetermined level to move said auxiliary valve means from its partially open to its closed position, and means responsive to movement of the main valve closure member to restrict the flow of liquid through said orifice means.

2. A valve device for controlling the filling of receptacles with liquid comprising a body defining a through passage for the liquid and a valve seat in said passage, a main valve closure member co-operating with said valve seat to close the passage and urged towards an open position by liquid flowing through said passage into the receptacle to which the valve device is fitted, resilient means urging said valve closure member towards the seat, a control chamber in said body in which liquid pressure acts to urge said valve closure member towards the seat, orifice means providing communication between the upstream side of the valve closure member and said control chamber, auxiliary valve means to control the escape of liquid from said control chamber, said auxiliary valve means comprising two separate valves, first means responsive to the liquid level in the receptacle to close one of said valves when the liquid reaches a lower predetermined level in said receptacle, second means responsive to the liquid level in the receptacle to close the other of said valves when the liquid reaches a higher predetermined level in said receptacle, and means responsive to closing movement of the main valve closure member to restrict the flow of liquid through said orifice means.

3. A valve device for controlling the filling of receptacles with liquid comprising a body defining a through passage for the liquid and a valve seat in said passage, a main valve closure member co-operating with said valve seat to close the passage and urged towards an open position by liquid flowing through said passage into the receptacle to which the valve device is fitted, resilient means urging said valve closure member towards the seat, a control chamber in said body in which liquid pressure acts to urge said valve closure member towards the seat, orifice means providing communication between the upstream side of the valve closure member and said control chamber, an auxiliary valve to control the escape of liquid from said control chamber, suction means to close said auxiliary valve comprising a piston, means connecting said piston to said auxiliary valve, and a cylinder in which said piston is slidably mounted, a venturi, liquid passing through said auxiliary valve passing also through said venturi, means whereby flow of liquid through said venturi induces flow of air from said cylinder, means to supply air to said cylinder from said receptacle, said air supply means comprising first and second conduits closed by the liquid respectively at a lower predetermined level and at a higher predetermined level in said receptacle, means moving with said auxiliary valve to connect only said first conduit to the cylinder when the auxiliary valve is fully open and to connect only said second conduit to the cylinder when the auxiliary valve reaches a predetermined partially closed position, whereby said auxiliary valve is moved to the predetermined partially closed position by the closing of the first conduit and to the fully closed position by the closing of the second conduit, and means responsive to closing movement of the main valve closure member to restrict the flow of liquid through said orifice means.

4. A valve device for controlling the filling of receptacles with liquid comprising a body defining a through passage for the liquid and a valve seat in said passage, a main valve closure member co-operating with said valve seat to close the passage and urged towards an open position by liquid flowing through said passage into the receptacle to which the valve device is fitted, resilient means urging said valve closure member towards the seat, a control chamber in said body in which liquid pressure acts to urge said valve closure member towards the seat, orifice means providing communication between the upstream side of the valve closure member and said control chamber, first and second auxiliary valves each controlling an escape path for liquid from said control chamber, first and second pistons, means connecting said first and second pistons respectively to said first and second auxiliary valves, first and second cylinders in which said first and second pistons are respectively slidably mounted, a venturi in each of said escape paths, means whereby flow of liquid through each venturi induces flow of air from the cylinder in which the piston connected to the auxiliary valve in the escape path including that venturi, a first conduit to supply air to the first cylinder from the receptacle, a second conduit to supply air to the second cylinder from the receptacle, the first conduit being closed by liquid at a lower predetermined level in the receptacle and the second conduit being closed by liquid at a higher predetermined level in the receptacle, whereby suction is effective to close the first auxiliary valve when the liquid reaches the lower predetermined level and is effective to close the second auxiliary valve when the liquid reaches the higher predetermined level, and means responsive to closing movement of the main valve closure member to restrict the flow of liquid through said orifice means.

5. The combination of a liquid receptacle and a valve device controlling the flow of liquid into and out of the said receptacle comprising a valve body located in said receptacle, a valve seat in said body surrounding an orifice in the bottom wall of the receptacle, a main valve closure member co-operating with said valve seat to close said orifice, said valve body defining a control chamber into which the main valve closure member moves as the valve device opens, said main valve closure member having an orifice connecting the control chamber to the upstream side of the main valve closure member when the valve device is open, auxiliary valve means controlling the escape of liquid from the control chamber to the receptacle, means responsive to the level of liquid in the receptacle to operate said auxiliary valve means so as to reduce the rate of escape of liquid from the control chamber when the liquid reaches a lower predetermined level and to prevent the escape of liquid from said control chamber when the liquid reaches a higher predetermined level, a stem extending through the orifice in the main valve closure member and having means to restrict the flow of liquid through said orifice as the main valve closure member moves towards the closed position, co-operating abutments on said main valve closure member and stem, and manually operated means acting on said stem to lift said valve closure member and allow the escape of liquid from the receptacle.

References Cited in the file of this patent

UNITED STATES PATENTS

| | | |
|---|---|---|
| 1,872,871 | Annin | Aug. 23, 1932 |
| 2,491,521 | Samiran | Dec. 20, 1949 |
| 2,509,978 | Ksieski | Mar. 30, 1950 |
| 2,616,450 | Legge et al. | Nov. 4, 1952 |
| 2,619,108 | Sweeney | Nov. 25, 1952 |
| 2,630,822 | Davies | Mar. 10, 1953 |
| 2,699,316 | Mosher | Jan. 11, 1955 |